United States Patent [19]

Ohya et al.

[11] Patent Number: 5,247,751
[45] Date of Patent: Sep. 28, 1993

[54] TOUCH PROBE

[75] Inventors: Kiyoshi Ohya, Yokohama; Masaru Hachisuka, Urawa; Hiroo Tsumuraya; Yoshiyuki Fujita, both of Yokohama; Osamu Arai, Yokosuka, all of Japan

[73] Assignee: Nikon Corporation, Tokyo, Japan

[21] Appl. No.: 908,739

[22] Filed: Jul. 6, 1992

Related U.S. Application Data

[63] Continuation of Ser. No. 765,317, Sep. 25, 1991, abandoned.

[30] Foreign Application Priority Data

Sep. 29, 1990 [JP] Japan .................. 2-262432

[51] Int. Cl.$^5$ .................... G01B 21/04; G01B 7/03
[52] U.S. Cl. .................... 33/561; 33/558
[58] Field of Search ............. 33/561, 503, 504, 556, 33/558, 559, 23.08, 23.11

[56] References Cited

U.S. PATENT DOCUMENTS

| 4,270,275 | 6/1981 | McMurtry | 33/561 |
| 4,625,417 | 12/1986 | Cusack | 33/561 |
| 4,866,854 | 9/1989 | Seltzer | 33/561 |
| 5,018,280 | 5/1991 | Enderle et al. | 33/561 |
| 5,040,931 | 8/1991 | Spivey et al. | 33/559 |
| 5,058,433 | 10/1991 | Wilson et al. | 33/561 |

FOREIGN PATENT DOCUMENTS 2005022  4/1979  United Kingdom .

Primary Examiner—William A. Cuchlinski, Jr.
Assistant Examiner—C. W. Fulton
Attorney, Agent, or Firm—Shapiro and Shapiro

[57] ABSTRACT

A touch probe comprises an ultrasonic vibrating horn having a piezoelectric element which is sandwiched between electrodes and converts an RF electrical signal into ultrasonic vibration, and a feeler to be brought into contact with an object to be measured. The horn is ultrasonically vibrating in accordance with the ultrasonic vibration of said piezoelectric element. The probe further comprises a device for inputting an RF electrical signal between said electrodes so that the RF electrical signal substantially coincides with a mechanical natural frequency of said ultrasonic vibrating horn and a touch detecting device for monitoring a current between said electrodes to detect a touch between the object to be measured and said feeler in accordance with a change in current value produced at the moment said feeler touches the object to be measured.

14 Claims, 12 Drawing Sheets

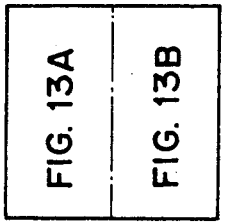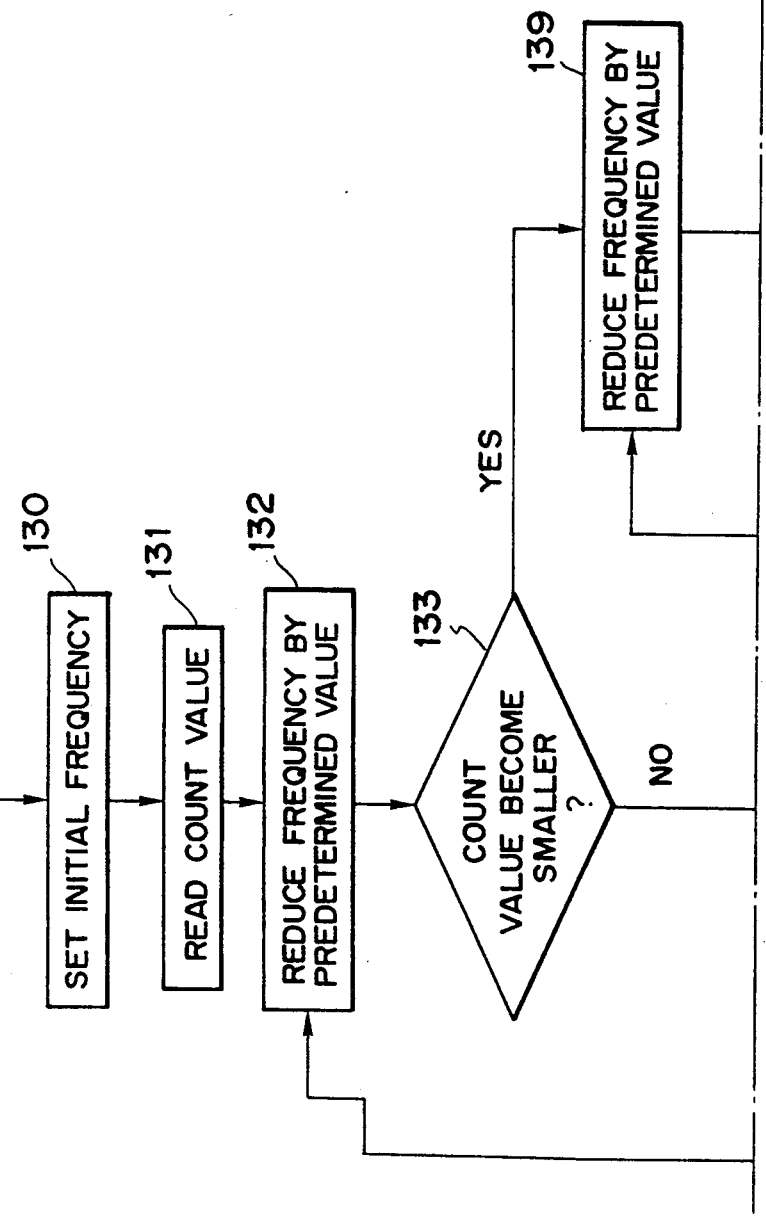

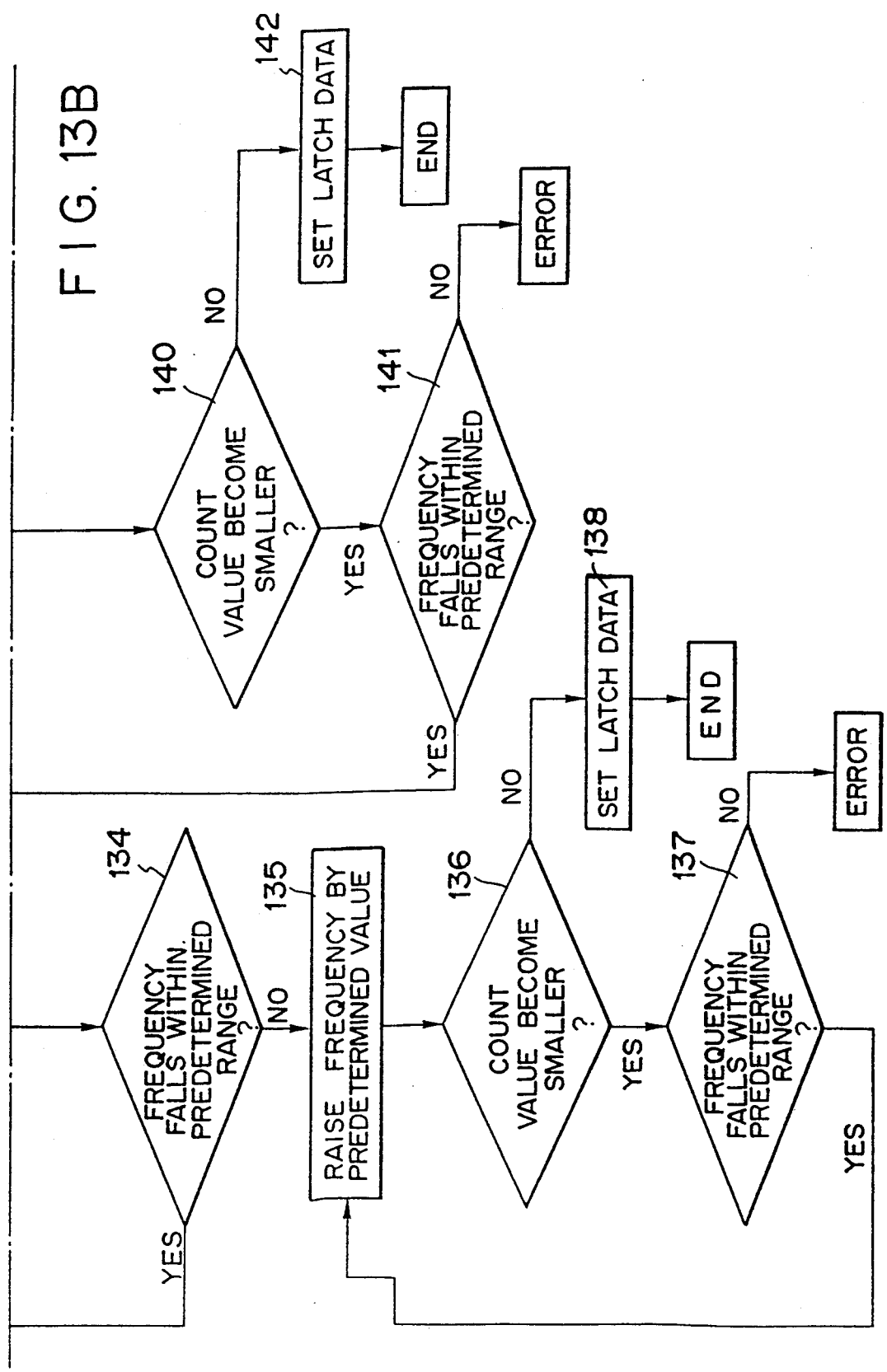

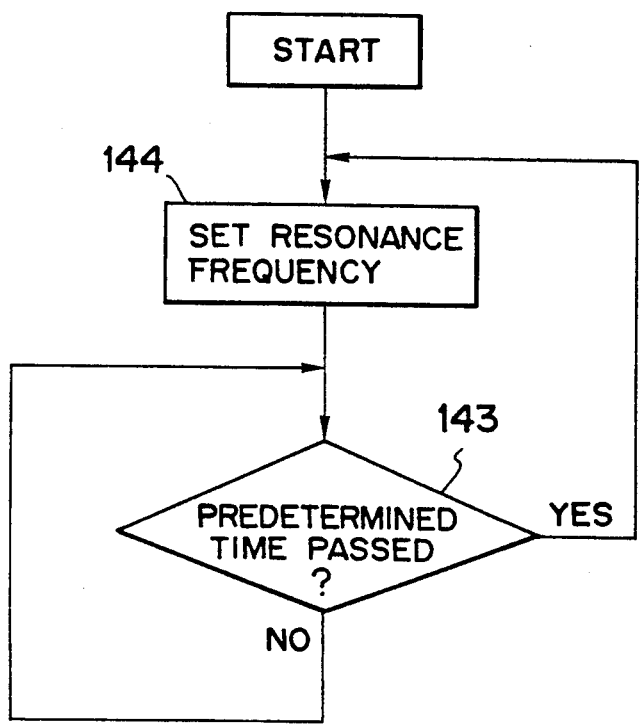
F I G. 14

TOUCH PROBE

This is a continuation of application Ser. No. 765,317 filed Sep. 25, 1991, now abandoned.

BACKGROUND OF THE INVENTION

1. Field of the Invention

The present invention relates to a contact detection probe and, more particularly, to a touch probe used in a three-dimensional coordinate measuring unit.

2. Related Background Art

In a three-dimensional measuring unit or the like, a probe is brought into contact with an object to be measured placed on a table, and the contact point is three-dimensionally detected to perform stereoscopic measurement of the object having a complicated shape. In this measurement, an error in detection of the contact point results in an error in a measured shape.

A general mechanism of a conventional touch probe used in a measuring unit of this type is as follows. Three pins provided on a table for holding a feeler are supported by three V-shaped support portions, and the pins and the support portions serve as electric contacts to form a closed circuit. When the feeler is brought into contact with and urged against an object to be measured, the contacts are opened to obtain a touch signal.

In the conventional techniques as described above, since the three pins of the feeler are urged against the contacts by springs, the pins must be lifted against basing forces of the springs in order to open the contacts. Therefore, it is difficult to reduce a measuring force.

In addition, the measuring force has directivity because three contacts are present. Therefore, an uncorrectable error is caused in a measurement result.

SUMMARY OF THE INVENTION

The present invention has been made in consideration of the above conventional problems and has as its object to provide a touch probe having a small measuring force and no directivity in the measuring force.

More particularly, in accordance with one of its principal aspects, the invention provides a touch probe which comprises an ultrasonic vibrating horn having a piezoelectric element which is mounted on one end of or inside the ultrasonic vibrating horn and converts an RF electrical signal into ultrasonic vibration and having a feeler which is mounted on the other end of the ultrasonic vibrating horn and is to be brought into contact with an object to be measured, means for inputting an RF electrical signal to the piezoelectric element so that the RF electrical signal substantially coincides with a mechanical natural frequency of the ultrasonic vibrating horn, and means for monitoring a current between electrodes of the piezoelectric element to detect a touch between the object to be measured and the distal end of the feeler in accordance with a change in current value produced at the moment the distal end of the feeler touches the object to be measured.

In accordance with another of its principal aspects, the present invention provides touch probe which comprises an ultrasonic vibrating horn having a piezoelectric element which is mounted on one end of or inside the ultrasonic vibrating horn and converts an RF electrical signal into ultrasonic vibration and having a feeler which is mounted on the other end of the ultrasonic vibrating horn and is to be brought into contact with an object to be measured, means for inputting an RF electrical signal to the piezoelectric element so that the RF electrical signal substantially coincides with a mechanical natural frequency of the ultrasonic vibrating horn, and means for monitoring a phase difference between a current and a voltage between electrodes of the piezoelectric element to detect a touch between the object to be measured and the distal end of the feeler in accordance with a change in phase difference produced at the moment the distal end of the feeler touches the object to be measured.

According to the present invention, the piezoelectric element is used to bring the feeler into contact with an object to be measured while causing the feeler to generate ultrasonic vibration such as longitudinal vibration, torsional vibration, or deflection vibration at a mechanical resonance frequency, and a change in impedance of the piezoelectric element or various phenomena caused by the change is or are detected, thereby detecting that the feeler is in contact with the object. Therefore, by using only simply shaped mechanical parts and simple electric circuits, a touch probe having very high sensitivity and no directivity in a measuring force can be effectively obtained.

BRIEF DESCRIPTION OF THE DRAWINGS

FIGS. 13, 13A and 13B is a flow chart for explaining an operation of the CPU shown in FIG. 12; and FIGS. 14 and 15 are flow charts each for explaining an operation of the CPU, in which the set timing of a resonance frequency is taken into consideration.

DESCRIPTION OF THE PREFERRED EMBODIMENTS

Embodiments of the present invention will be described in detail below with reference to the accompanying drawings.

Figure 1:
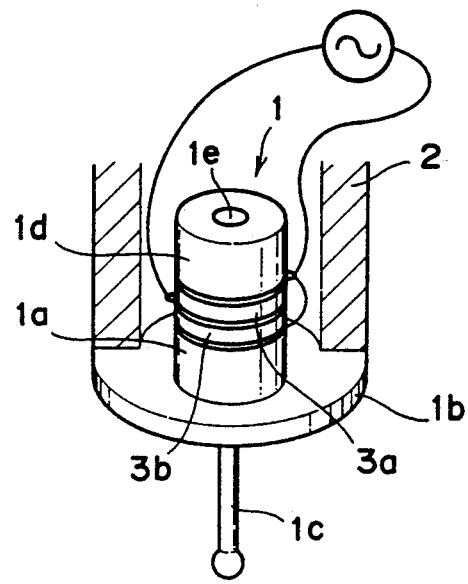
FIG. 1 is a perspective view of an embodiment according to the present invention.
Figure 4:
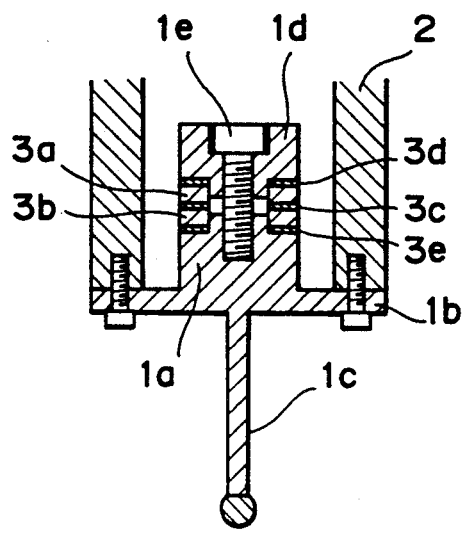
FIG. 4 is a longitudinal sectional view showing FIG. 1.
Figure 5:
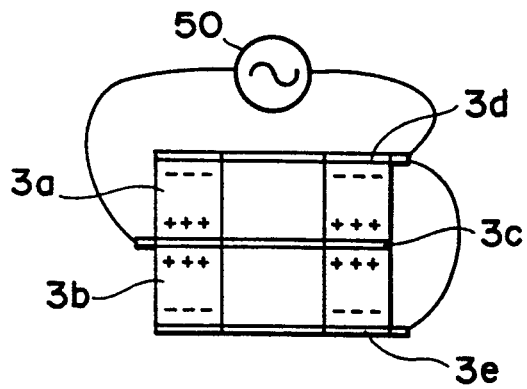
FIG. 5 is a view for explaining the piezoelectric element.
Figure 6:
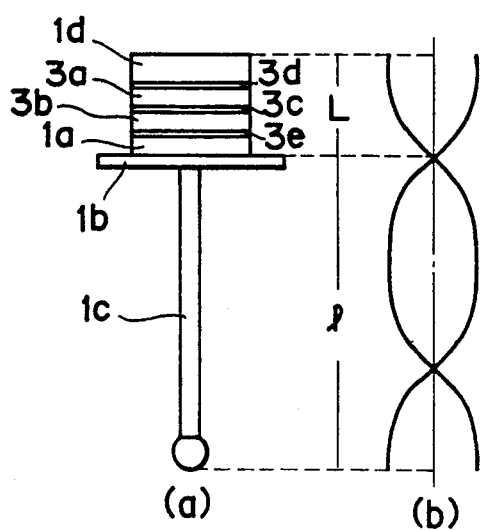
FIG. 6 is a view showing an amplitude mode of a vibrating horn.

FIG. 1 is a perspective view showing an embodiment of the present invention, and FIG. 4 is a longitudinal sectional view of FIG. 1. A vibrating horn 1 is constituted by a large-diameter portion 1a, a flange 1b connected to the lower end face of the large-diameter portion 1a, a feeler 1c connected to the lower end face of the flange 1b, piezoelectric elements 3a and 3b and electrodes 3c, 3d, and 3e arranged on the upper end face of the large-diameter portion 1a, a cap 1d for sandwiching and fixing the piezoelectric elements 3a and 3b and the electrodes 3c, 3d, and 3e between the cap 1d and the upper end face of the large-diameter portion 1a, and a screw 1e for fixing the cap 1d to the large-diameter portion 1a. The flange 1b is fixed to a support member 2, and the support member 2 is held by a probe main body or a probe head (neither of which are shown). The piezoelectric elements 3a and 3b are stacked such that the piezoelectric element 3a is sandwiched between the electrodes 3c and 3d and the piezoelectric element 3b is sandwiched between the 3c and 3e. As shown in FIG. 5, an AC power source 50 is connected between the common electrode 3c and the electrode 3d, and the electrodes 3d and 3e are short-circuited. Since the piezoelectric element 3 is polarized as shown in FIG. 5, the vibrating horn 1 ultrasonically vibrates in the axial direction. In this vibration, a frequency applied between the electrodes 3c and 3d and between the electrodes 3c and 3e by the AC power source 50 is substantially equal to the mechanical resonance frequency of the vibrating horn 1. Assuming that the sonic velocity of a longitudinal wave in a substance which forms the vibrating horn 1 is C, the mechanical natural frequency of the vibrating horn 1 is f, n=0, 1, 2, 3, ..., and m=0, 1, 2, 3, ..., a length L of the large-diameter portion of the vibration horn 1 and a length l of its small-diameter portion are determined by $$L = \frac{C}{4f}(1 + 2n) \text{ and } l = \frac{C}{4f}(1 + 2m),$$

respectively, as shown in (a) of FIG. 6.

For example, when the material of the vibrating horn is steel, L=13 mm and l=39 mm assuming that the sonic velocity of a longitudinal wave propagating in the steel is C=5,200 m/s, n=0, m=1, and f=100 kHz.

In FIG. 6, (b) shows the mode of vibration of the vibrating horn. The length L of the large-diameter portion and the length l of the small-diameter portion are determined such that the flange 1b is located at a position where the vibration amplitude is almost 0, and the vibrating horn is fixed to the support member 2 by the flange 1b located in this position. In this manner, an influence of fixing of the vibrating horn on vibration is minimized. During vibration, a maximum amplitude is obtained at the distal end of the feeler 1c of the vibrating horn. Therefore, if this portion is restrained, the vibration is significantly interfered with. If the vibration is interfered with, an electrical impedance of the piezoelectric element changes to change the value of a current flowing through the piezoelectric element 3. Alternatively, a resonance frequency of the entire vibrating horn slightly changes to cause a change in phase difference between the current flowing through the piezoelectric element and the voltage applied thereto.

Figure 2:
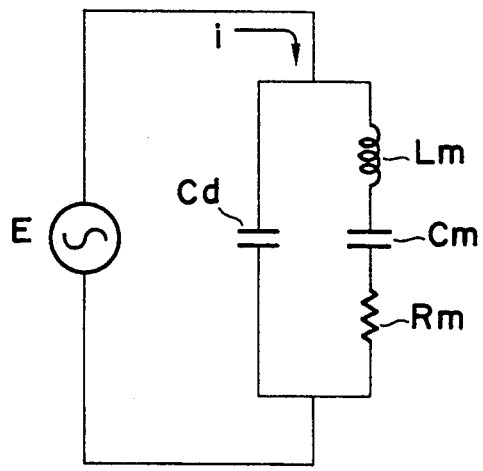
FIG. 2 is an equivalent circuit diagram of a piezoelectric circuit.
Figure 3:
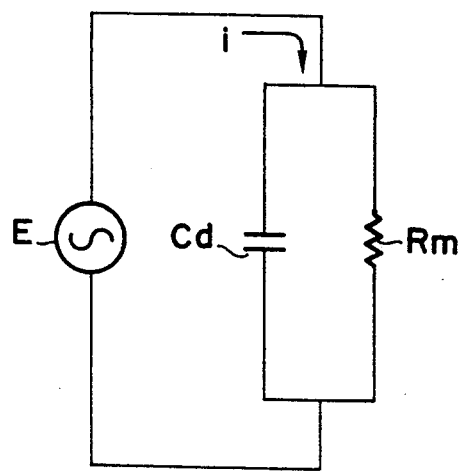
FIG. 3 is an equivalent circuit diagram obtained upon resonance.

An operation of the touch probe of the present invention having the above arrangement will be described below by taking a case using longitudinal vibration as an example. First, the piezoelectric element 3 polarized in the axial direction is used to cause the feeler to ultrasonically vibrate at the mechanical resonance frequency. In the mode of this vibration, the flange 1b as a support portion of the feeler 1c is a node, and two ends of the vibrating horn are antinodes. That is, the amplitude is maximized at the distal end portion of the feeler 1c. When this portion touches an object to be measured, the vibration of the feeler 1c is significantly interfered with to change the impedance of the piezoelectric element 3. This phenomenon can be represented by an electric circuit as follows. As shown in FIG. 2, an equivalent circuit of the vibrating system using the piezoelectric element 3 can be represented by an arrangement in which a capacitor $C_d$ is connected in parallel with a series circuit of a coil $L_m$, a capacitor $C_m$, and a resistor $R_m$. At a resonance point, $L_m$ and $C_m$ cause series resonance and cancel each other to form a circuit as shown in FIG. 3, and an impedance Z of the vibrating element is represented by $$\frac{1}{Z} = j\omega C_d + \frac{1}{R_m}$$

where $\omega$ is the angular velocity of vibration.

Since $R_m$ is increased when a mechanical load such as interference in vibration is increased, the impedance Z is increased when the distal end of the vibrating horn touches an object to be measured, so the current flowing through the piezoelectric element 3 is decreased.

Assuming that an application voltage is E, a current flowing through the piezoelectric element 3 is obtained by $$i = E\left(j\omega C_d + \frac{1}{R_m}\right).$$

This equation indicates that a phase difference of $\theta = \tan^{-1}(\omega C_d R_m)$ is present between the current i and the voltage E. When the resistance $R_m$ is increased, a phase angle $\theta$ is increased.

Thus, when the feeler 1c touches an object to be measured, the current value flowing through the piezoelectric element 3 changes or a change is caused in phase difference between the current and the voltage. Since these changes are very sensitive to the presence/absence of contact, a touch signal can be obtained with very high sensitivity. In addition, no directivity occurs in a measuring force because interference in vibration equally occurs regardless of the contact direction of the distal end 1c of the feeler 1c.

Figure 7:
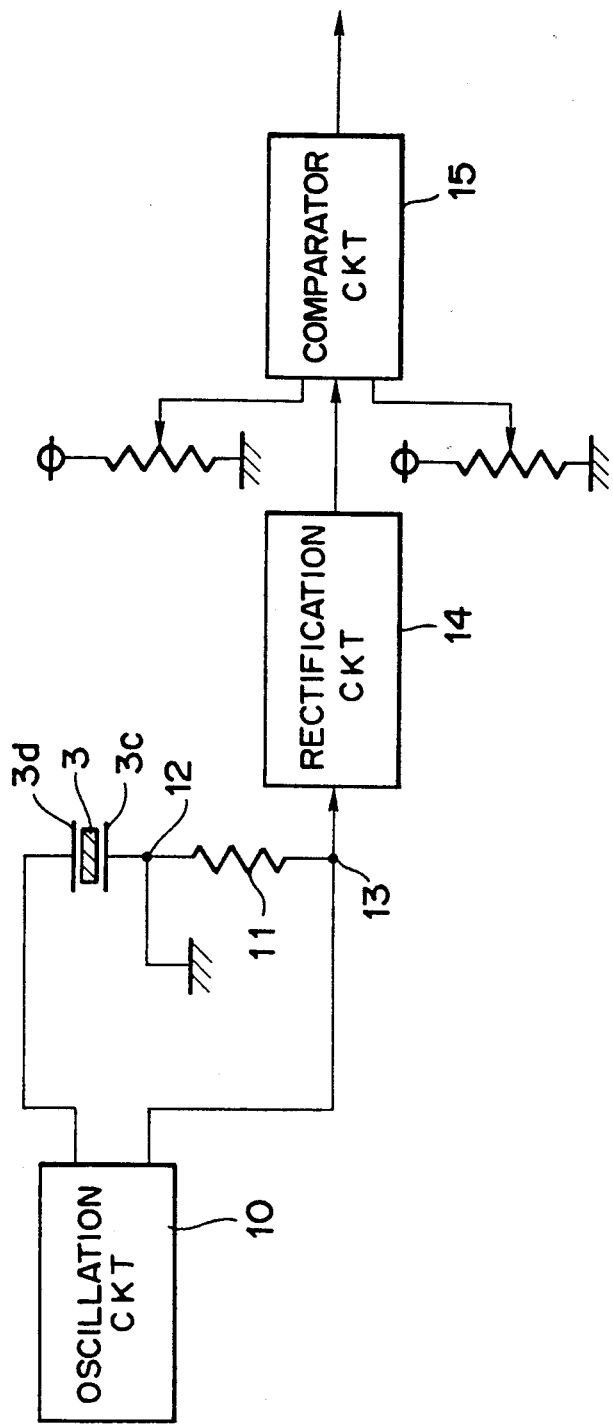
FIG. 7 is a block diagram showing an oscillation circuit and a detection circuit connected to the piezoelectric element shown in FIG. 1.

FIG. 7 is a block diagram showing an RF oscillation circuit and a detection circuit connected to the vibrating element shown in FIG. 1. One output terminal of the oscillation circuit 10 is connected to one terminal of a resistor 11 for current value measurement at a node 13, and the other terminal of the resistor 11 is connected to the electrode 3c of the piezoelectric element 3 at a node 12. The other output terminal of the oscillation circuit 10 is connected to the electrode 3d. Therefore, a voltage at the node 13 on the non-ground side of the resistor 11 is proportional to a current flowing through the circuit. The voltage of the resistor 11 is converted into a direct current by a rectification circuit 14 and supplied to a comparator 15 such as a window comparator. The threshold value of the comparator circuit 15 is set in a resonance state such that the output voltage value from the rectification circuit 14 is shifted from the threshold value when the distal end of the feeler 1c of the vibrating horn touches an object to be measured. As a result, when the output voltage value from the rectification circuit 14 is shifted from the threshold value, the comparator circuit 15 outputs a touch signal.

Figure 8:
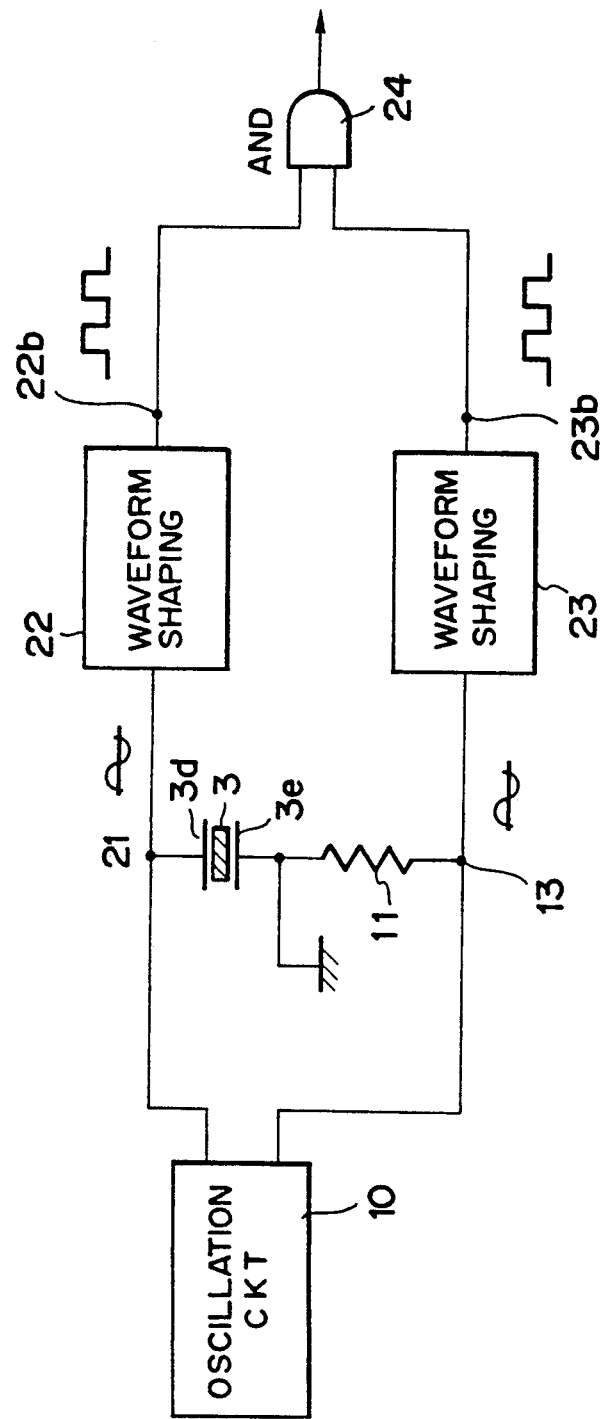
FIG. 8 is a block diagram showing another embodiment of the detection circuit connected to the piezoelectric element shown in FIG. 1.
Figure 9:
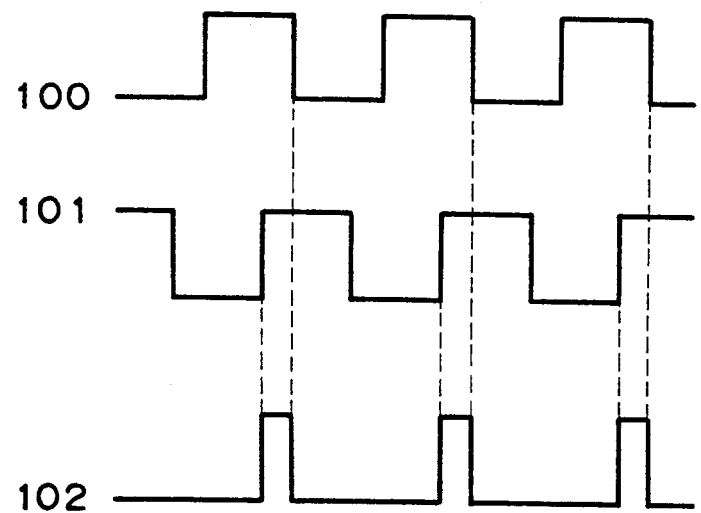
FIG. 9 is a timing chart for explaining waveforms of signals at nodes shown in FIG. 8.

FIG. 8 is a block diagram showing another embodiment of the detection circuit. The same reference numerals as in FIG. 7 denote the same parts in FIG. 8 and a detailed description thereof will be omitted. In this circuit, a phase difference between a voltage at a node 21 between the electrode 3d on the non-ground side of the piezoelectric element 3 and the other output terminal of an oscillation circuit 10 and a voltage at a node 13 proportional to a current flowing through a resistor 11 is monitored. When a force of interfering vibration is applied while the vibrating horn is ultrasonically vibrated at the mechanical resonance frequency, the phase difference between the voltage and the current changes. This change is very sensitive to react with even a slight external force. Since the outputs at the nodes 21 and 13 are sine waves, they are converted into square waves by waveform shaping circuits 22 and 23, respectively, and ANDed by an AND gate 24. FIG. 9 shows waveforms at nodes shown in FIG. 8. That is, a signal 100 is an output from the waveform shaping circuit 22 obtained at a node 22b in FIG. 8, and a signal 101 is an output from the waveform shaping circuit 23 obtained at a node 23b in FIG. 8. A signal 102 is an output from the AND gate 24 obtained by ANDing the signals 100 and 101. When the phase difference between the signals 100 and 101 changes, the pulse width of the signal 102 changes. When the distal end of the feeler 1c touches an object to be measured, the phase difference between the signals 100 and 101 changes, and the pulse width of the signal 102 changes accordingly. This change is detected to output a touch signal.

The vibrating horn for longitudinal vibration in which the piezoelectric element longitudinally vibrates has been described above. However, a touch signal can be similarly obtained by a vibrating horn for torsional vibration in which the piezoelectric element torsionally vibrates or a vibrating horn for deflection vibration in which the piezoelectric element performs deflection vibration.

Assume that a horn for torsion vibration is the same in a structure constituted by large- and small-diameter portions as the horn shown in FIG. 6 but different in the structure of a piezoelectric element therefrom and consists of steel. In this case, assuming that the sonic velocity C of torsion vibration propagating in the steel is 3,200 m/s, n=0, m=1, and f=100 kHz, L=8 mm and l=24 mm.

A horn for deflection vibration is constituted by a rod having a uniform diameter. Assuming that the sonic velocity of deflection vibration is $C_b$, the diameter of the rod is d, and the frequency of vibration is f, a length $L_o$ of the rod is $$L_o = 4.73 \sqrt{\frac{d \cdot C_b}{32\pi f}}$$

in a primary mode. Assuming that the material of the horn is steel, $C_b$=4,200 m/s. Assuming that f=100 kHz and d=5 mm, $L_o$=13.7 mm.

In a secondary mode, $$L_o = 7.85 \sqrt{\frac{d \cdot C_b}{32\pi f}}$$

and $L_o$=22.7 mm.

Figure 10:
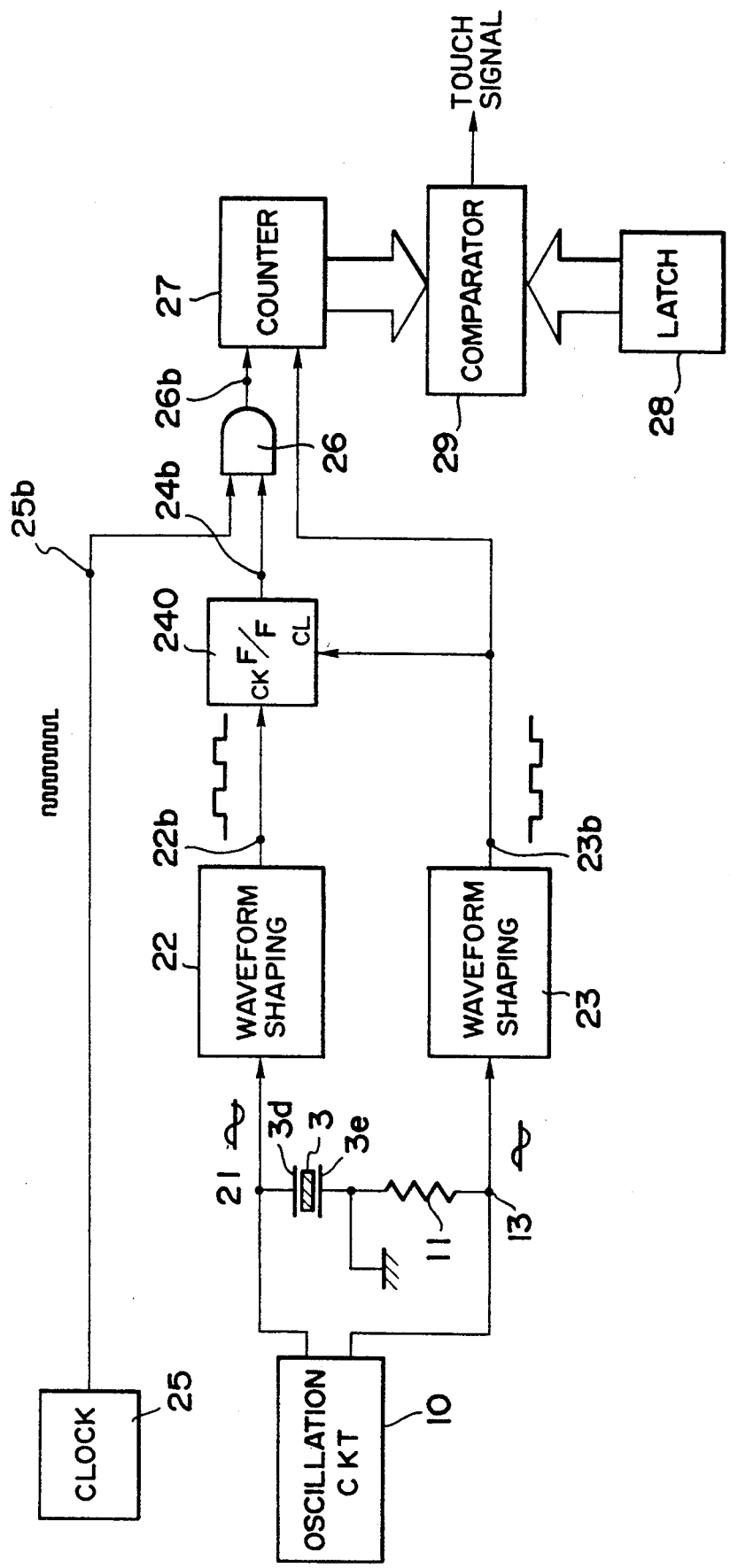
FIG. 10 is a block diagram showing still another embodiment connected to the piezoelectric element shown in FIG. 1.

FIG. 10 is a block diagram showing still another embodiment of a detection circuit usable in place of that shown in FIG. 8. The same reference numerals as in FIG. 8 denote the same parts in FIG. 10. In this circuit, similar to the circuit shown in FIG. 8, a phase difference between a voltage at a node 21 on the electrode 3d side of the piezoelectric element 3 and a voltage at a node 13 on the resistor side thereof is monitored. When the vibrating horn is ultrasonically vibrated at the mechanical resonance frequency, the phase difference between a voltage and a current changes if a force of interfering the vibration is applied. In the circuit shown in FIG. 10, the phase difference is increased. This change is very sensitive to react with even a slight external force. Since outputs at the nodes 21 and 13 are sine waves, they are converted into square waves by waveform shaping circuits 22 and 23 and supplied to a clock (CK) and a clear (CL) of a flip-flop 240, respectively. As a result, an output 102 (see FIG. 11 to be described later) from the flip-flop 240 becomes a pulse having as a pulse width a phase difference between a voltage across the piezoelectric element 3 and a current flowing through the piezoelectric element 3. The output from the flip-flop 240 and an output from a clock generator 25 are supplied to an AND gate 26. The AND gate 26 ANDs the output 102 from the flip-flop 240 and a clock pulse 103 (see FIG. 11 to be described later) as the output from the clock generator 25 and outputs the result to an up counter 27. The counter 27 counts the output pulses from the AND gate 26. The counter 27 has a reset terminal connected to the waveform shaping circuit 23 and is reset at the leading edge of a pulse of a current output. The value counted by the counter 27 is compared with a set value latched by a latch circuit 28 by a digital comparator 29. If the count value exceeds the set value, the digital comparator outputs a touch signal. The set value is set slightly larger than the count value in a resonance state.

Figure 11:
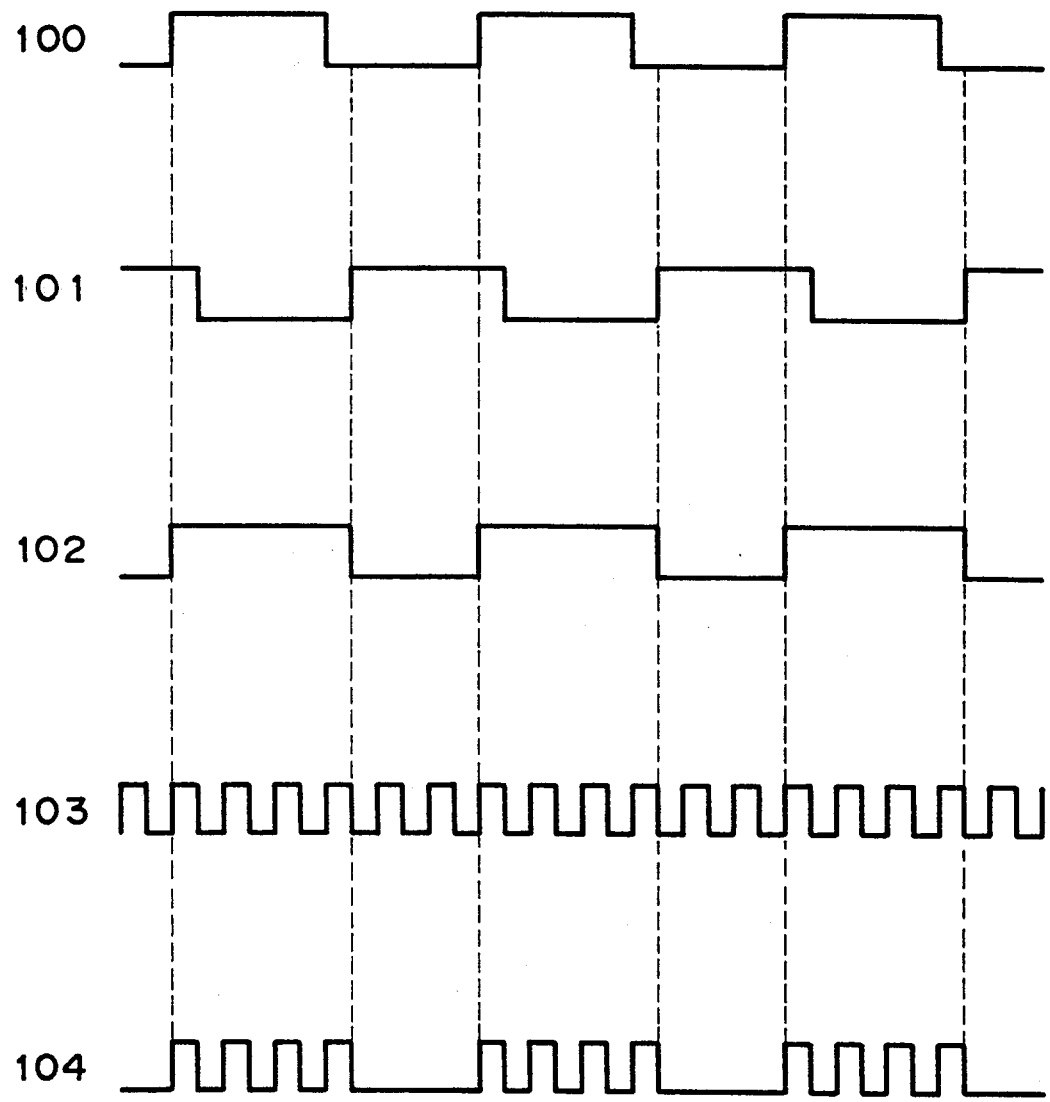
FIG. 11 is a timing charts for explaining waveforms of signals at nodes shown in FIG. 10.

FIG. 11 shows waveforms at nodes shown in FIG. 10, in which, although some of them have been already described above, signals 100, 101, 102, 103, and 104 are obtained at nodes 22b, 23b, 24b, 25b, and 26b, respectively, shown in FIG. 10.

In the circuit shown in FIG. 10, the phase difference in the resonance state is smaller than that in a non-resonance state and is minimized at a resonance point. Therefore, a point at which the phase difference is minimized while a frequency to be input to the piezoelectric element is changed can be considered as the resonance point. Therefore, a computer is used to fetch the count value of the counter 27, and the frequency to be input to the piezoelectric element is changed under the control of the computer. When programs run so that the count value is minimized, resonance can be automatically obtained. In this circuit, the phase difference is about 270° in the non-resonance state and about 180° in the resonance state.

Figure 12:
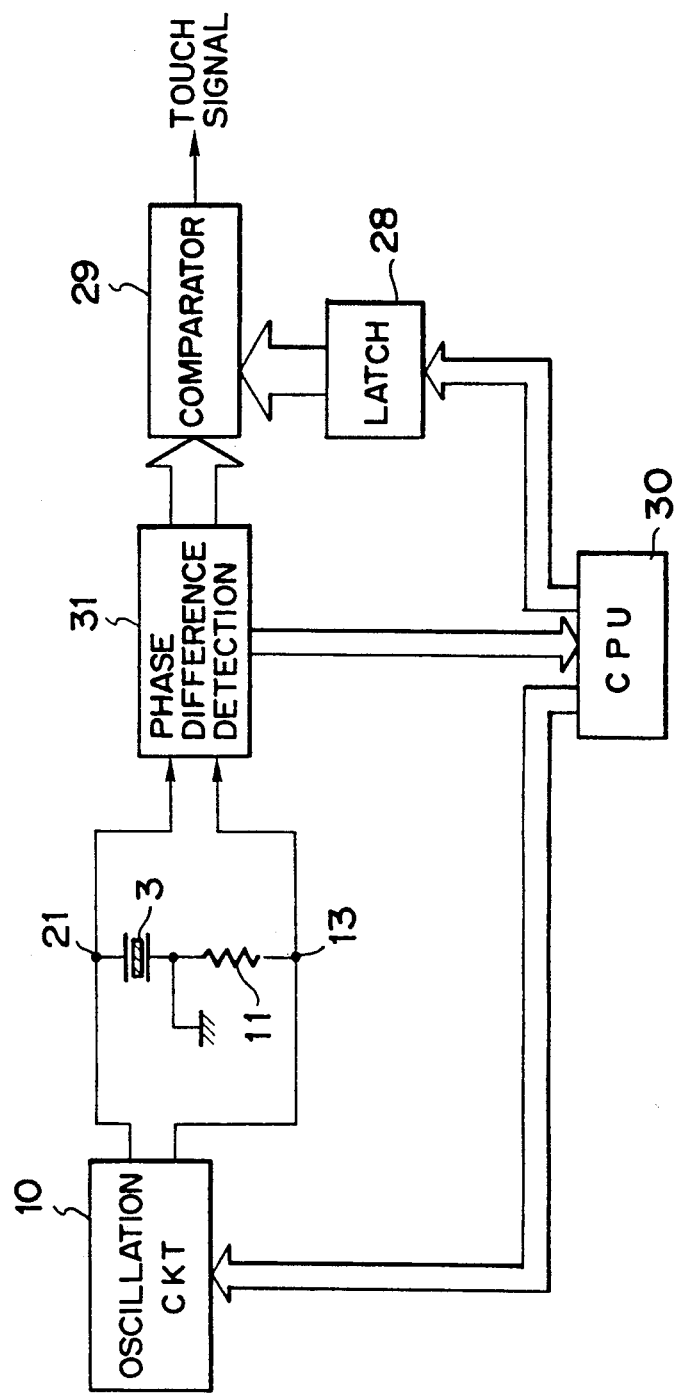
FIG. 12 is a block diagram showing a system using a control CPU for automatically obtaining resonance of a vibrating feeler.

FIG. 12 is a block diagram showing a system using the present invention. A CPU 30 commands an oscillation frequency of the oscillation circuit 10, and a phase difference detection circuit 31 reads a phase difference between a voltage across the electrodes of the piezoelectric element 3 and a current flowing through the piezoelectric element 3 and outputs a count value. The phase difference detection circuit 31 corresponds to the blocks 22, 23, 240, 25, 26, and 27 shown in FIG. 10. The CPU 30 changes the frequency output from the oscillation circuit 10 to minimize the phase difference in accordance with the change in count value output from the phase difference detection circuit 31, thereby obtaining resonance of the vibrating feeler. The CPU 30 supplies a value, which is experimentally determined to be slightly larger than the current count value, as a set value to the latch circuit 28.

FIG. 13 shows a flow chart of the CPU 30 in detail. The CPU 30 sets an initial value of a vibration frequency (step 130) and reads the count value of the phase difference detection circuit 31 (step 131). Subsequently, the CPU 30 reduces the frequency by a predetermined value (step 132) and compares the resultant count value with the count value in step 131 (step 133). If the count value becomes larger, the CPU 30 checks whether the frequency falls within a predetermined search range (step 134). If the frequency falls within the predetermined search range, the flow returns to step 132. If the frequency falls outside the predetermined search range, the CPU 30 raises the frequency by a predetermined value (step 135). If the count value becomes smaller (step 136), the CPU 30 checks whether the frequency falls within the search range (step 137). If the frequency falls within the search range, the flow returns to step 135. If the frequency falls outside the search range, an error is determined. If the count value becomes larger in step 136, the CPU 30 sets the value as latch data (step 138). If the count value becomes larger in step 133, the CPU 30 reduces the frequency by a predetermined value (step 139) and checks whether the count value becomes smaller (step 140). If the count value becomes smaller, the CPU 30 checks whether the frequency falls within a predetermined search range (step 141). If the frequency falls within the predetermined search range, the flow returns to step 139. If the counter value becomes larger in step 140, the CPU 30 sets the count value as latch data (step 142). In this state, if the vibrating feeler touches an object to be measured, the phase difference between the interelectrode voltage of the piezoelectric element 3 and the current flowing through the piezoelectric element 3 is increased, and the count value counted by the phase difference detection circuit 31 exceeds the set value. Therefore, the digital comparator 29 immediately outputs a touch signal. In this embodiment, the digital circuit monitors the change in phase difference. However, the minimum value of phase difference may be detected by analog processing in which the output 102 at the node 24b of the circuit shown in FIG. 10 may be converted into a voltage by an integrator (not shown) and compared with the set voltage.

Figure 15:
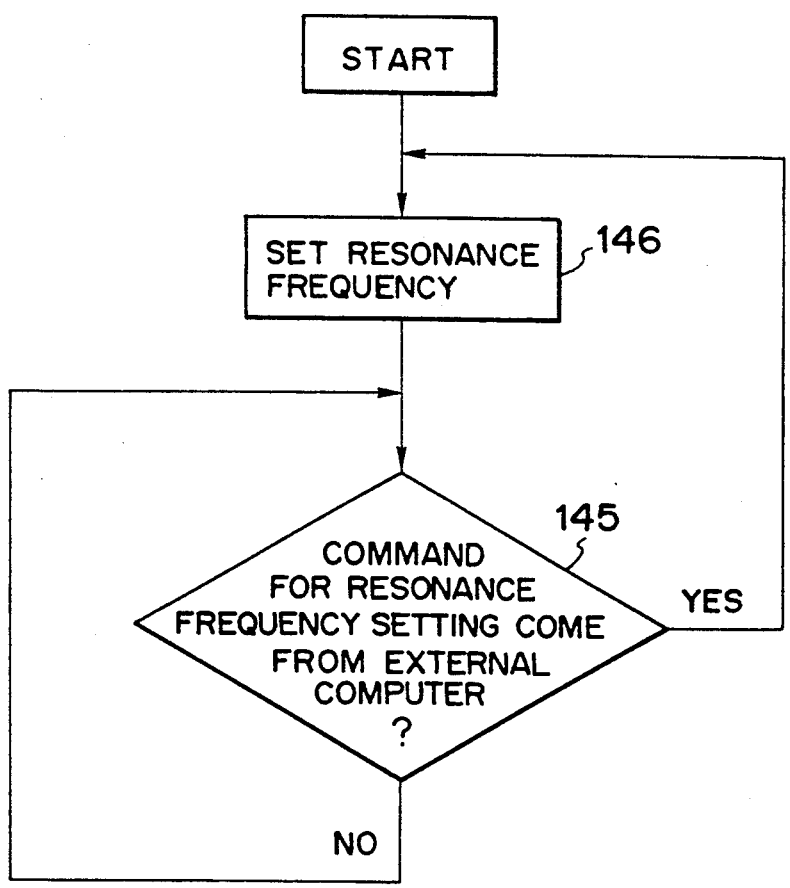

The mechanical resonance frequency of the vibrating feeler sometimes changes in accordance with external environmental conditions. If the feeler is set in a particularly extreme temperature environment, the phase difference may be gradually increased to finally exceed the set value. In such a case, a touch signal can be stably obtained by obtaining resonance every predetermined time period or immediately before the feeler touches an object to be measured, thereby resetting the set value. That is, as shown in a flow chart of FIG. 14, the CPU 30 shown in FIG. 13 checks whether a predetermined time passed (step 143), and performs the resonance frequency set operation shown in FIG. 13 each time the predetermined time passed (step 144). Alternatively, as shown in a flow chart of FIG. 15, the CPU 30 checks whether a command for resonance frequency setting comes from an external computer for controlling a moving locus of the probe (step 145), and performs the resonance frequency set operation shown in FIG. 13 for each time immediately before the vibrating feeler touches an object to be measured (step 146).

What is claimed is:

1. A touch probe comprising:
   an ultrasonic vibrating horn having a piezoelectric element which is sandwiched between electrodes and converts an RF electrical signal into ultrasonic vibration, and a feeler to be brought into contact with an object to be measured, said horn ultrasonically vibrating in accordance with the ultrasonic vibration of said piezoelectric element;
   means for inputting an RF electrical signal between said electrodes so that the RF electrical signal substantially coincides with a mechanical natural frequency of said ultrasonic vibrating horn; and
   touch detecting means for monitoring a current between said electrodes to detect a touch between the object to be measured and said feeler in accordance with a change in current value produced at the moment said feeler touches the object to be measured.

2. A touch probe comprising:
   an ultrasonic vibrating horn having a piezoelectric element which is sandwiched between electrodes and converts an RF electrical signal into ultrasonic vibration, and a feeler to be brought into contact with an object to be measured, said horn ultrasonically vibrating in accordance with the ultrasonic vibration of said piezoelectric element;
   means for inputting an RF electrical signal between said electrodes so that the RF electrical signal substantially coincides with a mechanical natural frequency of said ultrasonic vibrating horn; and
   touch detecting means for monitoring a phase difference between a current and a voltage between said electrodes to detect a touch between the object to be measured and said feeler in accordance with a change in phase difference produced at the moment said feeler touches the object to be measured.

3. A probe according to claim 1 or 2, wherein
   said ultrasonic vibrating horn comprises a large-diameter portion having said piezoelectric element, a small-diameter portion having said feeler, and a mount portion formed at a connection portion between said large-diameter portion and said small-diameter portion and mounted to a probe main body, and
   assuming that a sonic velocity of a longitudinal wave in a material forming said ultrasonic vibrating horn is C,
   a mechanical natural frequency of said ultrasonic vibrating horn is f,
   n=0, 1, 2, 3, . . . , and
   m=0, 1, 2, 3, . . . ,
   a length L of said large-diameter portion and a length l of said small-diameter portion are given by:

$$L = \frac{C}{4f}(1 + 2n)$$

$$l = \frac{C}{4f}(1 + 2m).$$

4. A probe according to claims 1 or 2, wherein said ultrasonic vibrating horn includes a first portion having said piezoelectric element, a second portion having said feeler, and holding means for holding said ultrasonic vibrating horn to be secured to a probe main body, said holding means being provided between said first portion and said second portion at a node of a mode of mechanical natural vibration of said ultrasonic vibrating horn, and wherein assuming that a sonic velocity of a longitudinal wave in a material forming said ultrasonic vibrating horn is C,
a mechanical natural frequency of said ultrasonic vibrating horn is f,
n=0, 1, 2, 3, ..., and
m=0, 1, 2, 3, ...,
a length of L of said first portion and a length l of said second portion are given by:

$$L = \frac{C}{4f}(1 + 2n)$$

$$l = \frac{C}{4f}(1 + 2m).$$

5. A probe according to claim 2, wherein said touch detecting means has a counter for counting a time period of clock pulses from a zero-crossing point of a value of said current to a zero-crossing point of a value of said voltage, and a comparing unit for outputting a touch trigger signal at the moment the count value of said counter exceeds a predetermined count value.

6. A probe according to claim 5, wherein the predetermined count value set in said comparing unit is a count value obtained by counting a time period of clock pulses from the zero-crossing point of the value of said current to the zero-crossing point of the value of said voltage when the RF electrical signal is so input as to substantially coincide with the mechanical natural frequency of said ultrasonic vibrating horn.

7. A probe according to claim 5, wherein a frequency at which the predetermined count value set in said comparing unit is a minimum count value obtained by counting a time period of clock pulses from the zero-crossing point of the value of said current to the zero-crossing point of the value of said voltage of said touch detecting means while a frequency of the input RF electrical signal is changed is defined as the mechanical natural frequency, and the minimum count value is set as a set value of said touch detecting means.

8. A probe according to claim 5, further comprising:
means for changing the frequency of the input RF electrical signal; and
means for setting the frequency at which the count value of said counter is minimized as the mechanical natural frequency, and setting the minimum count value as the predetermined count value.

9. A probe according to claim 8, further comprising updating commanding means for commanding updating of the predetermined count value for every predetermined time interval.

10. A probe according to claim 8, further comprising commanding means for commanding updating of the predetermined count value immediately before said feeler touches the object to be measured.

11. A touch probe comprising:
a horn having a pair of electrodes, transducer means sandwiched between said electrodes for converting an electrical signal applied to said electrodes into vibration, and a feeler to be brought into contact with an object to be measured;
means for applying an alternating current having a predetermined frequency to said electrodes to cause said feeler to vibrate; and
means for detecting a change in an electrical signal between said electrodes produced as a result of a change of impedance of said transducer means at the moment when said feeler touches the object to be measured.

12. A probe according to claim 11, wherein said detecting means detects a change in a phase difference between a current and a voltage between said electrodes.

13. A probe according to claim 11, wherein said predetermined frequency corresponds to a mechanical natural frequency of said horn.

14. A probe according to claim 11, wherein said detecting means detects a change in a phase difference between said alternating current and said electrical signal between said electrodes.

* * * * *